2,949,320

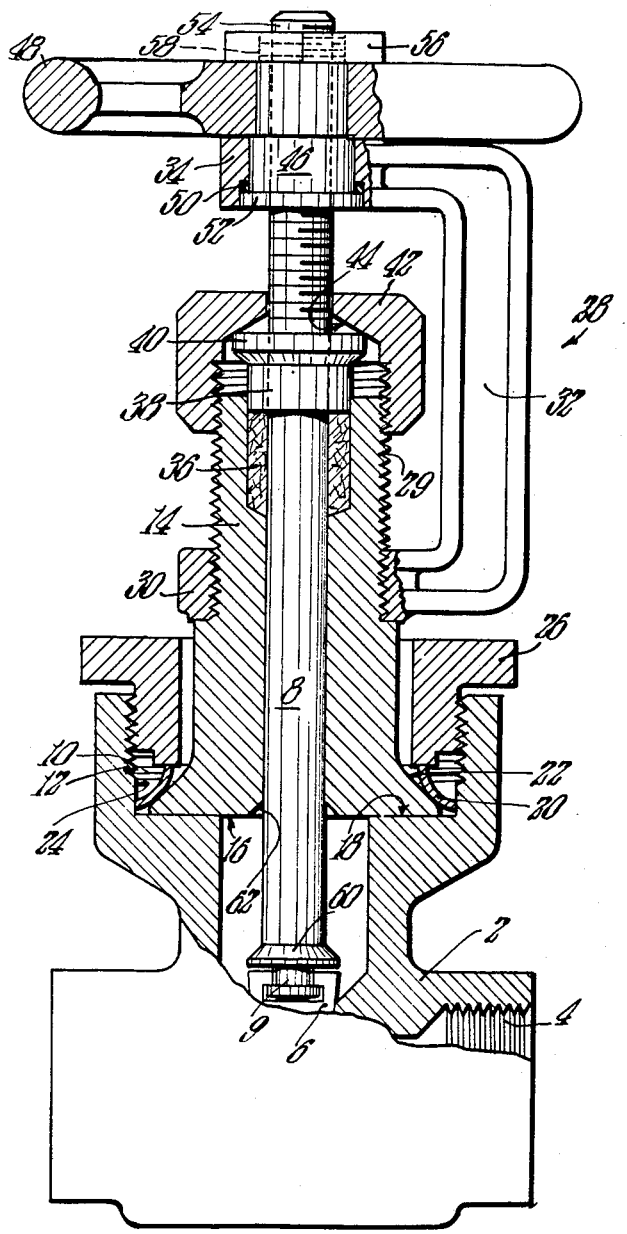

VALVE CONSTRUCTION

Sidney Low, Wilbraham, and Orlo A. Powell, Jr., Agawam, Mass., assignors, by mesne assignments, to The Chapman Valve Manufacturing Company, Chicago, Ill., a corporation of Delaware Filed Aug. 13, 1958, Ser. No. 754,795

1 Claim. (Cl. 285—356)

This invention relates to new and useful improvements in a valve construction and is directed more particularly to a valve construction incorporating novel sealing means between the body and bonnet thereof characterized by a novel yoke means.

According to one object of the invention, a novel sealing means is provided between the body and bonnet of the valve which is adapted for sealing against operating pressures, and is constructed and arranged so as to effectively operate for the sealing pressure when the valve components are assembled manually and without the tools commonly employed in valve assembly.

Another object of the invention is to provide a novel yoke means which is constructed and arranged to facilitate ready and easy access to the spindle stuffing-box mechanism so that same may be easily and readily worked upon, particularly in the field.

Another object of the invention is to provide a metallic pressure type ring seal at the junction of the body and bonnet of a valve.

Still another object of the invention is to provide a pressure type ring seal which can effectively maintain nominal operating pressures when the valve components are assembled hand tight.

Various objects and advantages of the invention will be apparent from the following description of the form of the invention presently preferred with reference to the drawing wherein:

The figure is a sectional elevational view through a valve structure embodying the novel features of the invention.

Referring now to the drawings in detail, the novel features and advantages of the valve structure of the invention will be described.

A valve body is shown at 2 which has an inlet and an outlet at opposite sides thereof, the inlet 4 only being illustrated. Opposite sides or ends of the body may be formed in various well known ways for connecting in a piping system.

A plug or gate 6 is shown in its closed position. A reciprocable spindle 8 of the outside type is connected at its lower end to the plug 6 in any usual and convenient manner.

The plug 6 and body 2, at opposite sides thereof, may be provided with engageable seats of any well known form. The spindle 8 and plug 6 may be connected for operation as in a valve of the well known inside type, should that be desired.

The upper side of the body is provided with a well 10 which is open at its upper side, and as shown, the wall thereof is internally threaded at 12.

An elongated bonnet 14, through which the spindle 8 extends, is located in the well of the body, and has a lower portion or face 16 which seats on and is supported by the bottom 18 of the well. If desired, a suitable gasket may be provided on the bottom 18 of the well to separate the body and bonnet in the event of severe corrosive service. Such gasket could be of metal, asbestos or plastic, as required.

The surface of the bonnet at the lower end thereof is formed so as to diverge or flare outwardly, all to provide a smooth annular angular seating surface 22 for a seal ring 20.

Said seal ring 20 is provided with upper and lower peripheral edges and the inner side of the ring is adapted to seat on the seating surface 16 of the bonnet. The lower outer periphery of the seal ring is adapted to abut the inner side 24 of the wall of the well, and the upper periphery of said ring is adapted to be engaged by a seal ring nut 26.

Said seal ring nut 26 is in threaded engagement with the screw threads 12 of the wall of the well. The bonnet 14 extends upwardly loosely through the nut 26, as shown, and a lower portion of the seal ring nut is in engagement with the upper periphery of the seal ring 20.

The seal ring is so designed that it deforms elastically in a radial direction when an axial load is transmitted to it by tightening the seal ring nut 26. The seal ring is of such a cross section that any hand tightening of the seal ring nut imparts sufficient elastic deformation to complete a seal satisfactory for low pressure service. The bonnet design is such that increasing operational pressure forces it upwardly against the seal ring, deflecting the ring radially toward the body for an effective nominal pressure seal.

A yoke indicated by 28 has a lower hub 30 which is in threaded engagement with a threaded portion 29 of the bonnet, and a single vertically extending strut portion 32 connects said hub 30 to an upper hub 34.

The upper end of the bonnet is provided with a bore around the spindle for any desired and suitable packing material, indicated by 36. A follower 38 around the spindle, above the packing and base, has an upper flange 40.

A follower nut 42, in threaded engagement with the upper end of the bonnet, is provided with an inner surface 44 engageable with the flange of the follower.

As the nut 42 is turned in one direction, the follower is urged downwardly to act on the packing material 36 in the usual well known manner.

A yoke nut 46 is rotatable in the upper hub 34 of the yoke, and is fixed to a hand wheel 48 in some suitable manner, as by a key, not shown. A thrust washer 50 is disposed above a lower flange 52 of the yoke nut 46, and said yoke nut is in threaded engagement with an upper threaded end 54 of the spindle. A check nut 56 is in the threaded engagement with an upper portion 58 of the yoke nut.

As the hand wheel is rotated in opposite directions, the plug is moved between its lower closed and seated position, and its upper open position. The spindle may be provided with an angular surface 60 which is engageable with a complemental surface 62 of the lower end of the bonnet.

The seal ring 20 will be formed from a deformable elastic material and preferably from a suitable metal. As shown, the seal ring has upper inner and outer lower peripheries and, in transverse cross section, its outer circumferential face is concave and its opposite inner face is convex.

The said seal ring 20 in transverse cross section may be said to be in the form of a quadrant of a tube and, if desired, the outer and inner faces thereof may be concentric, as shown.

In any event, the deformable elastic characteristics of the seal ring will be such that, as the seal ring nut 26 is turned downwardly, the lower end face thereof acts on the upper periphery of the seal ring. Such causes the seal ring inner face to snugly contact the smooth surface 22 of the bonnet, and the lower periphery thereof to abut the wall of the body well, while at the same time the bottom face of the bonnet is forced against the bottom of the wall.

Thus there is provided, between the body and bonnet, a non-leakable seal against pressures within the system including the valve.

The yoke has a single strut extending upwardly from a hub, connected to the bonnet below the stuffing box, and a hub disposed above the stuffing box. Said strut is disposed outwardly radially relative to the stuffing box to facilitate free access thereto.

Ordinarily, the yoke of a valve in service seriously interferes with and/or renders impossible the servicing of the stuffing box with the valve connected in a system or pipe line. By locating a single strut of the yoke outwardly away from the stuffing box, the stuffing box may be readily and easily worked upon.

The sealing arrangement is such that the bonnet and body are sealed against leakage while, with the surfaces 60 and 62 in sealing engagement in open position of the plug, the stuffing box may be repacked without difficulty.

Various changes and modifications may be made in the form of the invention without departing from the spirit and scope thereof, and it is desired to be limited, if at all, by the appended claim rather than by the foregoing description.

We claim:

A coupling structure for a valve bonnet coacting with a body having a threaded well in one side comprising, a hollow bonnet having a lower extremity nestable in the well of the body, the lower portion of said bonnet being provided with a lower outwardly flaring peripheral surface, a seal ring disposed around said bonnet and within the wall of said well, a seal ring nut in threaded engagement with said well for applying pressure to said seal ring, said seal ring being formed from deformable elastic material and having a concave cross section between upper and lower peripheries thereof, the convex side of said seal ring being in engagement with the flaring peripheral surface of said bonnet and upper and lower peripheries thereof being in engagement with the underside of said seal ring nut and within the wall of said well respectively whereby as pressure is applied to the said upper periphery said seal ring is deformed generally radially outwardly for sealing the flaring portion of said bonnet relative to said well.

References Cited in the file of this patent

UNITED STATES PATENTS

| | | |
|---|---|---|
| 855,385 | Churchill | May 28, 1907 |
| 1,142,369 | Schmidt | June 8, 1915 |
| 2,278,721 | Jones | Apr. 7, 1942 |
| 2,350,017 | Davis | May 30, 1944 |
| 2,744,775 | Bredtschneider | May 8, 1956 |

FOREIGN PATENTS

| | | |
|---|---|---|
| 590,303 | Great Britain | of 1947 |